(12) United States Patent
Zimmer et al.

(10) Patent No.: US 7,543,166 B2
(45) Date of Patent: Jun. 2, 2009

(54) SYSTEM FOR MANAGING POWER STATES OF A VIRTUAL MACHINE BASED ON GLOBAL POWER MANAGEMENT POLICY AND POWER MANAGEMENT COMMAND SENT BY THE VIRTUAL MACHINE

(75) Inventors: Vincent J. Zimmer, Federal Way, WA (US); Michael A. Rothman, Gig Harbor, WA (US)

(73) Assignee: Intel Corporation, Santa Clara, CA (US)

( * ) Notice: Subject to any disclaimer, the term of this patent is extended or adjusted under 35 U.S.C. 154(b) by 230 days.

(21) Appl. No.: 10/844,780

(22) Filed: May 12, 2004

(65) Prior Publication Data

US 2005/0268078 A1 Dec. 1, 2005

(51) Int. Cl.
*G06F 1/32* (2006.01)
(52) U.S. Cl. ...................... 713/310; 713/323
(58) Field of Classification Search ......... 713/300–340; 718/1, 100–108
See application file for complete search history.

(56) References Cited

U.S. PATENT DOCUMENTS

| | | | | |
|---|---|---|---|---|
| 5,109,510 | A * | 4/1992 | Baker et al. | 718/104 |
| 5,530,860 | A * | 6/1996 | Matsuura | 718/105 |
| 6,408,393 | B1 * | 6/2002 | Imada et al. | 713/300 |
| 7,073,076 | B2 * | 7/2006 | Imada et al. | 713/300 |
| 2002/0083110 | A1 * | 6/2002 | Kozuch et al. | 709/1 |
| 2003/0200247 | A1 * | 10/2003 | Banzhaf et al. | 709/1 |
| 2004/0221290 | A1 * | 11/2004 | Casey et al. | 718/104 |
| 2005/0060590 | A1 * | 3/2005 | Bradley et al. | 713/320 |
| 2005/0160151 | A1 * | 7/2005 | Rawson, III | 709/213 |

OTHER PUBLICATIONS

Steve Bennett et al., "Mechanism for Controlling External Interrupts in a Virtual Machine System", U.S. Appl. No. 10/318,248, filed Dec. 11, 2002.
Gilbert Neiger et al., "Use of Multiple Virtual machine Monitors to Handle Privileged Events", U.S. Appl. No. 10/663,206, filed Sep. 15, 2003.
Stephen M. Bennett et al, "Mechanism to Control Hardware Interrupt Acknowledgment in a Virtual Machine System", U.S. Appl. No. 10/676,887, filed Sep. 15, 2003.
Vijay Tewari et al., "Use of a Virtual Machine to Emulate a Hardware Device", U.S. Appl. No. 10/808,991, filed Mar. 24, 2004.
Vijay Tewari et al., "Vitalizing Management Hardware for a Virtual Machine", U.S. Appl. No. 10/880,929, filed Jun. 30, 2004.
Vincent J. Zimmer et al., "Method to Manage Memory in a Platform with Virtual Machines", U.S. Appl. No. 10/827,763, filed Apr. 19, 2004.

* cited by examiner

*Primary Examiner*—Thuan N Du
(74) *Attorney, Agent, or Firm*—Thomas R. Lane

(57) ABSTRACT

Power management commands from virtual machines (VMs) in a VM environment may be trapped by a VM monitor. Depending on the current power states of the other VMs in the VM environment, the VMM may emulate increase or decrease in available resources as applied to the VM issuing the power management commands. The VMM may modify the actual hardware resources available in a platform when such modification may not affect the current power states of the VMs in the VM environment.

21 Claims, 4 Drawing Sheets

SYSTEM FOR MANAGING POWER STATES OF A VIRTUAL MACHINE BASED ON GLOBAL POWER MANAGEMENT POLICY AND POWER MANAGEMENT COMMAND SENT BY THE VIRTUAL MACHINE

FIELD OF INVENTION

The present invention relates generally to virtual machines, and more specifically to power management in the virtual machine environments.

BACKGROUND OF INVENTION

A conventional virtual-machine monitor (VMM) typically runs on a computer system and presents to other software the abstraction of one or more virtual systems or machines. Each virtual machine may function as a self-contained platform, running its own "guest operating system" (i.e., an operating system (OS) hosted by the VMM) and other software, collectively referred to as guest software. The guest software operates as if it were running on a dedicated computer system rather than a virtual machine. That is, the guest software expects to control various events and to be able to access various hardware resources

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION

Figure 1:
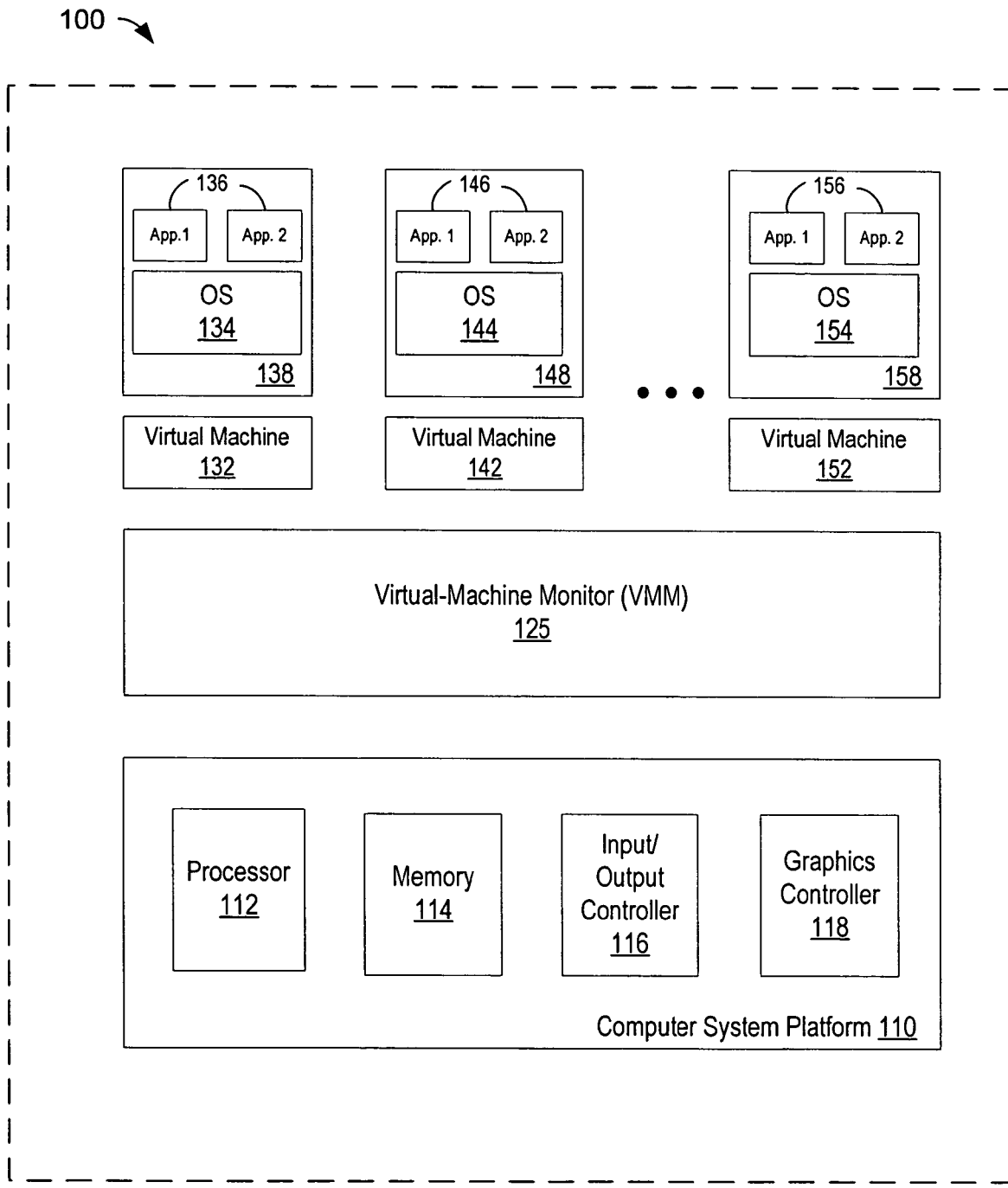
FIG. 1 is a block diagram that illustrates an example of a virtual machine environment, in accordance with one embodiment.

A method and apparatus for handling power management in virtual machine environments are described. Power management operations performed by the guest operating systems in the multiple virtual machines may be emulated by a virtual machine monitor (VMM).

In the following description, for purposes of explanation, numerous specific details are set forth in order to provide a thorough understanding of the present invention. It will be apparent, however, to one skilled in the art that the present invention can be practiced without these specific details. Some portions of the detailed descriptions that follow are presented in terms of algorithms and symbolic representations of operations on data bits within a computer system's registers or memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or the like, may refer to the action and processes of a computer system, or similar electronic computing device, that manipulates and transforms data represented as physical (electronic) quantities within the computer system's registers and memories into other data similarly represented as physical quantities within the computer-system memories or registers or other such information storage, transmission or display devices.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

Although the below examples may describe embodiments of the present invention in the context of execution units and logic circuits, other embodiments of the present invention can be accomplished by way of software. For example, in some embodiments, the present invention may be provided as a computer program product or software which may include a machine or computer-readable medium having stored thereon instructions which may be used to program a computer (or other electronic devices) to perform a process according to the present invention. In other embodiments, steps of the present invention might be performed by specific hardware components that contain hardwired logic for performing the steps, or by any combination of programmed computer components and custom hardware components.

Thus, a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, a transmission over the Internet, electrical, optical, acoustical or other forms of propagated signals (e.g., carrier waves, infrared signals, digital signals, etc.) or the like.

Further, a design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, data representing a hardware model may be the data specifying the presence or absence of various features on different mask layers for masks used to produce the integrated circuit. In any representation of the design, the data may be stored in any form of a machine-readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or re-transmission of the electrical signal is performed, a new copy is made. Thus, a communication provider or a network provider may make copies of an article (a carrier wave) embodying techniques of the present invention.

Computer System and Virtual Machine Environment

FIG. 1 is a block diagram that illustrates an example of a virtual machine environment, in accordance with one embodiment. Computer system 100 may be implemented to support a virtual machine environment which may include virtual machine monitor (VMM) 125 and computer system platform 110. The virtual machine environment may enable the hardware resources in the computer system 100 to be distributed across many concurrent operating system sessions executing within virtual machines (VM).

The computer system platform 110 may be the hardware platform of a handheld device, portable computer, set-top box, or any other computing system. The computer system platform 110 may include at least one processor 112, memory 114, input/output controller 116, graphics controller 118, and other platform hardware devices (not shown). The processor 112 may be any type of processor (e.g., a microprocessor, digital signal processor, microcontroller, or the like) capable of executing software instructions. The processor 112 may include microcode, programmable logic or hard-coded logic for performing operations associated with various embodiments described herein.

Memory 114 may be a hard disk, a floppy disk, random access memory (RAM), read only memory (ROM), flash memory, any combination of the above devices, or any other type of machine medium readable by the processor 112. The memory 114 may store instructions or data for performing the operations associated with various embodiments described herein.

The VMM 125 may be implemented in hardware, software, firmware, or in combinations. The VMM 125 may present hardware virtualization of resources available in the computer system platform 110 including, for example, hardware registers. The VMM 125 may present abstraction of one or more VMs 132, 142, 152 to various guest software 138, 148, 158. The guest software 138, 148, 158 running on each of the VMs 132, 142, 152 may include a guest OS 134, 144 or 154 and various software applications 136, 146 or 156, respectively. The VMM 125 may provide the same or different abstractions of VMs to the guest software 138, 148, and 158.

Virtual Machines in Mobile Environment

Conserving power is an important aspect when using a computer system in a mobile environment, especially when operating with a direct current (DC) power source such as, for example, a battery. Typically, when there is a long period of no activity, an OS may issue power management commands to the appropriate hardware ports to bring the computer system to a lower power mode to reduce power consumption.

Referring to FIG. 1, when the computer system 100 is a mobile computer system, the VMs 132, 142, 152 may operate under a certain behavior model when using a DC power source. With hardware virtualization by the VMM 125, each of the guest software 138, 148, or 158 may operate as if it is able to have complete access to hardware resources (e.g., processor registers, memory, I/O devices, etc.) on the computer system platform 110. Each of the VMs 132, 142, 152 may have its own local power management policy. For example, when using a DC power source, the VM 132 may decide to go from a "normal on" state to a sleep state to save power consumed by the processor 112. The normal on state may be a full power high performance state while the sleep state may be a low power low performance state such as an S3 state as recognized by the Advanced Configuration and Power Interface (ACPI) specification, Revision 2.0a dated Mar. 31, 2002 (and published by Compaq Computer Corporation, Intel Corporation, Microsoft Corporation, Phoenix Technologies Ltd., and Toshiba Corporation). The ACPI specification recognizes a collection of different sleep states (notably the "S1", "S2", "S3" and "S4" states) each having its own respective balance between power savings and delay when returning to the "normal on" state.

Prior to entering a sleep state, the context or operating environment of the VM 132 may be saved under the perception that processor 112 may go into a lower power consumption state. The saved context may be used to restore the same environment to the VM 132 when it returns to the normal on state. It may be possible that while the VM 132 wants to enter a sleep state (such as the S3 state), one or more of the VM 142 and VM 152 may want to remain in the normal on state. If each VM can have complete access to the hardware resources without any kind of regulation, their conflicting power management commands or directives may potentially cause the virtual machine environment and one or more of the VMs 132, 142 and 152 to fail.

Figure 2:
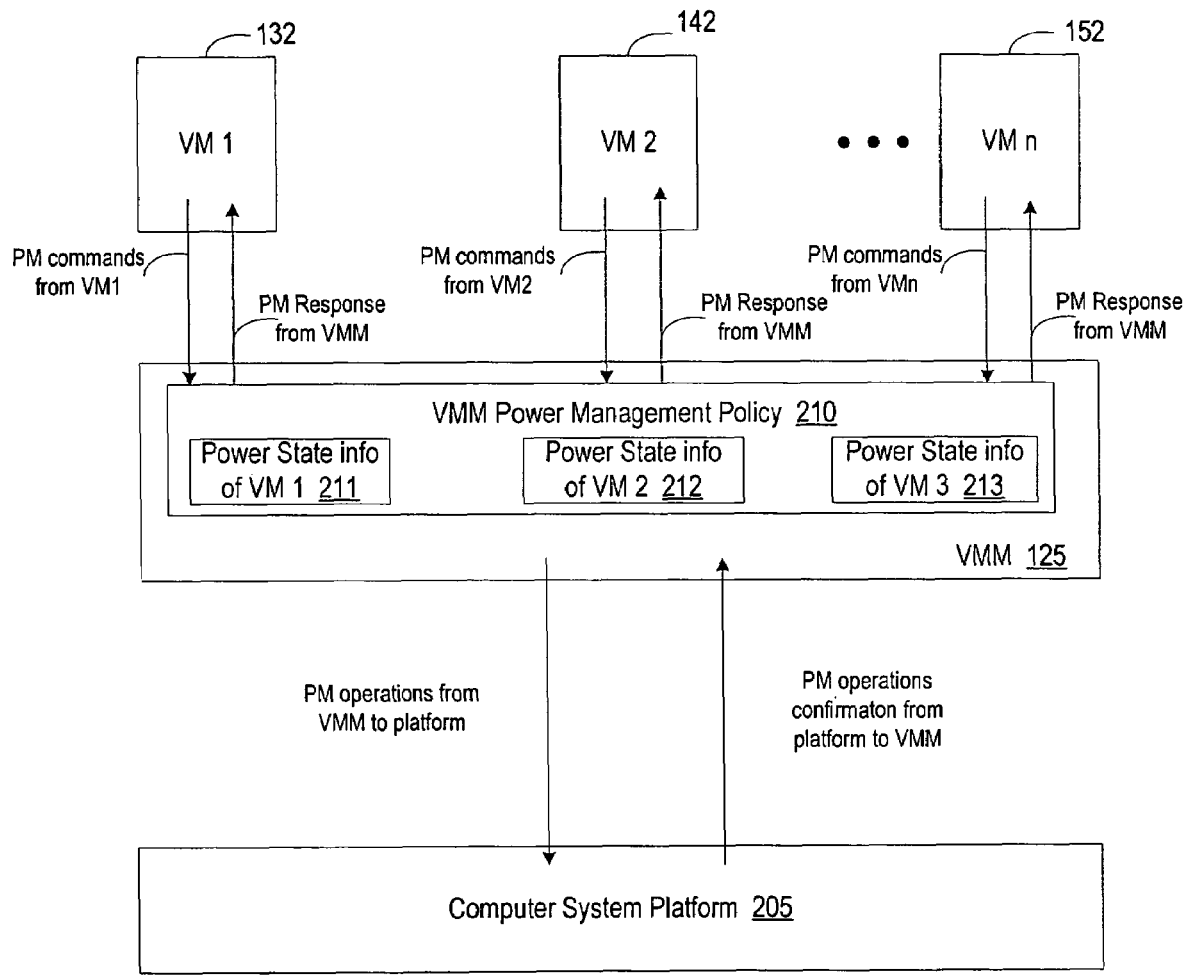
FIG. 2 is a block diagram that illustrates an example of a power management policy to handle power management commands from the virtual machines, in accordance with one embodiment.

FIG. 2 is a block diagram that illustrates an example of a power management policy to handle power management commands from the virtual machines, in accordance with one embodiment. To facilitate the conflicting power management commands from the different VMs 132, 142, 152, the VMM 125 may retain control over the hardware resources. For one embodiment, the VMM 125 may trap the power management commands from the VMs 132, 142, 152 and handle the commands based on a power management policy 210. The power management policy 210 may incorporate system power savings settings as configured for the computer system 100. For example, the system power savings settings may indicate that when the computer system 100 is operating with a DC power source, the processor 112 is to operate at a lower speed, the hard drive is to spin down after a shorter length of time, etc. The VMM 125 may use the system power savings settings as a global power management policy or boundary while it handles the power management commands from the VMs 132, 142 and 152.

For another embodiment, the power management policy 210 may also incorporate power state information 211, 212 and 213 of the VMs 132, 142 and 152. The power state information of a VM may include information that describes a current operating state of the VM. For example, the power state information 211 may indicate that the VM 132 is in a deep sleep state, the power state information 212 may indicate that the VM 142 is in a normal on state, and the power state information 213 may indicate that the VM 152 is in a standby state. The VMM 125 may use the power state information 211, 212, and 213 to help determine the appropriate response to the power management commands from the VMs 132, 142 and 152.

For one embodiment, responsive to the power management commands from a VM, the VMM 125 may emulate modification to the hardware resources without any actual modification. For example, because the VM 142 may be operating in the normal on state, the VMM 125 may emulate the result of the commands to reduce power from the VM 132 by giving the VM 132 less resource (e.g., fewer scheduling time, etc.), effectively slowing down its operations. The VMM 125 may not actually place the processor 112 or any other hardware resources into a low power consumption state. The power state information 211 of the VM 132 may then be updated to indicate that the VM 132 may be operating in a low power consumption state. When applicable, the VMM 125 may also emulate placing the VM 132 into a sleep state (e.g., S3 state). This may be referred to as a virtualized sleep state. The VMM 125 may save the context of the VM 132 to a region of memory and suspend the VM 132. This context may then be used for a subsequent restore when the VM 132 returns to a higher power consumption state or normal on state.

For one embodiment, responsive to the power management commands from a VM, the VMM 125 may make some modification to the hardware resources. For example, to accommodate the power management commands from the VM 132, instead of placing the processor 112 into a lowest power consumption state as directed by the VM 132, the VMM 125 may decide to throttle the processor 112 so that some power savings may be achieved while the VMs 142 and 152 may continue to operate in their normal on state without too much impact.

For one embodiment, responsive to the power management commands from a VM, the VMM 125 may make all necessary modification to the hardware resources to reduce the power consumption of the computer system 100. For example, when the VMM 125 traps the power management commands from the VM 132 and the VMM 125 recognizes that the other VMs 142, 152 are already in the low power state as indicated by their respective power state information 212, 213, the VMM 125 may proceed to place the processor 110 into a low power consumption state. This may not affect the operations of the VMs 142, 152 because they are already under the perception that they are, for example, in a sleep state. Thus, depending on how the power management policy 210 is implemented and the current operating state of each of the VMs 132, 142 and 152, the VMM 125 may perform various combinations of operations to accommodate the power management commands from each of the VMs 132, 142, and 152.

Trapping the VM Power Management Commands

Figure 3:
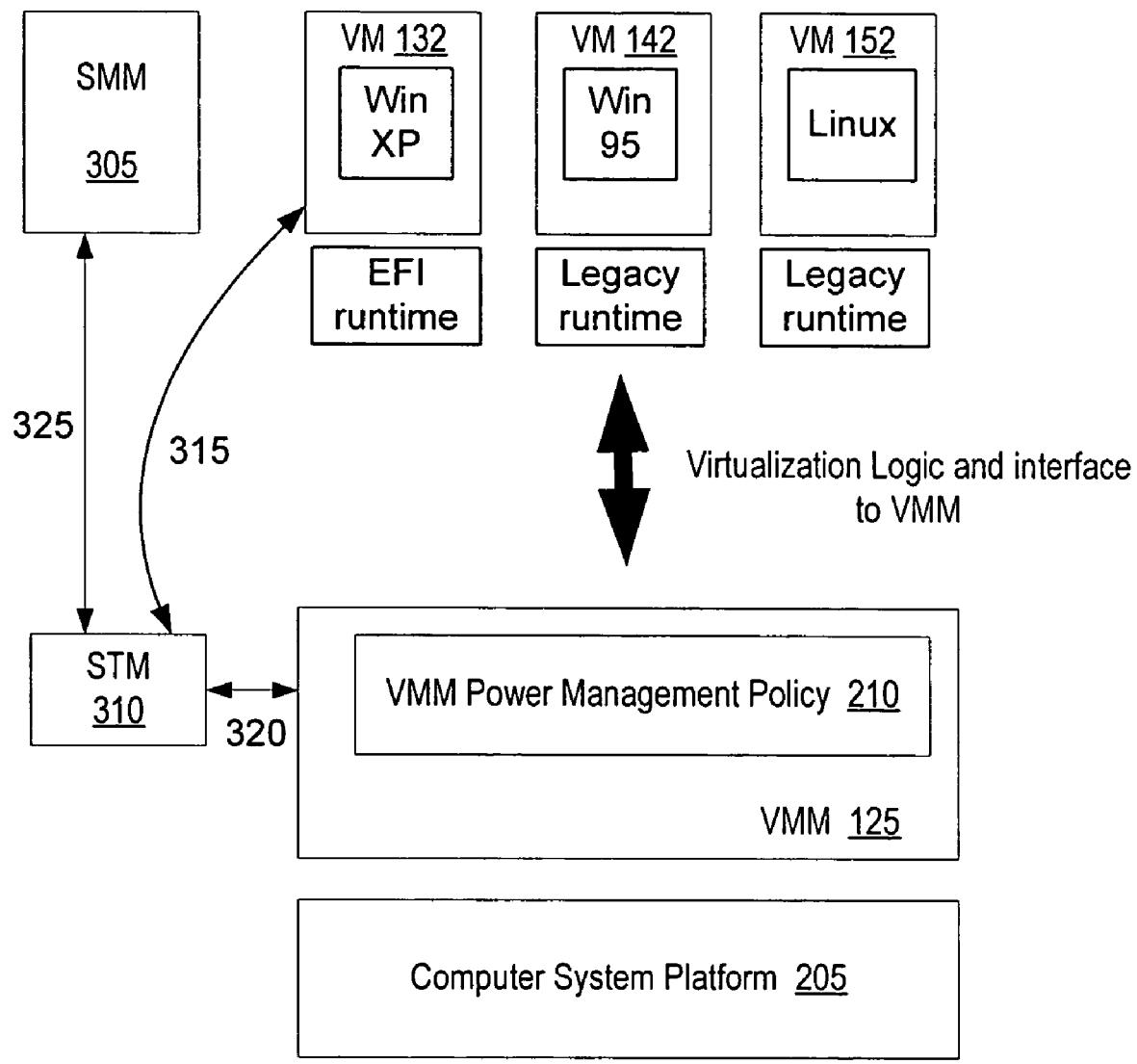
FIG. 3 is a block diagram illustrating an example of using a transfer monitor to trap power management commands from the VMs, in accordance with one embodiment.

FIG. 3 is a block diagram illustrating an example of using a transfer monitor to trap power management commands from the VMs, in accordance with one embodiment. The power management commands from the VMs 132, 142, 152 may be in the form of system management interrupts (SMI). The SMI transfer monitor (STM) 310 may be used to trap these SMIs from the VMs 132, 142, 152 (illustrated as path 315) and notify the VMM 125 (illustrated as path 320). The STM 310 may be implemented as part of the VMM 125. The STM 310 may also route the SMIs to appropriate emulation service routine stored in the system management mode (SMM) memory 305. For the example, the SMM 305 may include a service routine or program that emulates changing the power management registers (e.g., model specific registers (MSRs) of the processor 112. It may be noted that although the example above refers to using SMI and SMM to trap the power management commands from the VMs, other techniques may also be used by the VMM to trap the power management commands and to emulate modification of the resources.

It may be noted that the example in FIG. 3 also illustrates that with the virtualization of the logic and interface in the virtual machine environment, each of the VMs 132, 142, 152 may run a different operating system (e.g., Linux, Windows XP, Windows 95), and each of the VMs 132, 142, 152 may be associated with a different implementation of runtime interface (e.g., extensible firmware interface (EFI), legacy basic input/output system (BIOS), etc.). One skilled in the art may recognize that VM exit and VM switching may be performed by the VMM 125 on behalf of the VMs 132, 142, and 152.

Process

Figure 4:
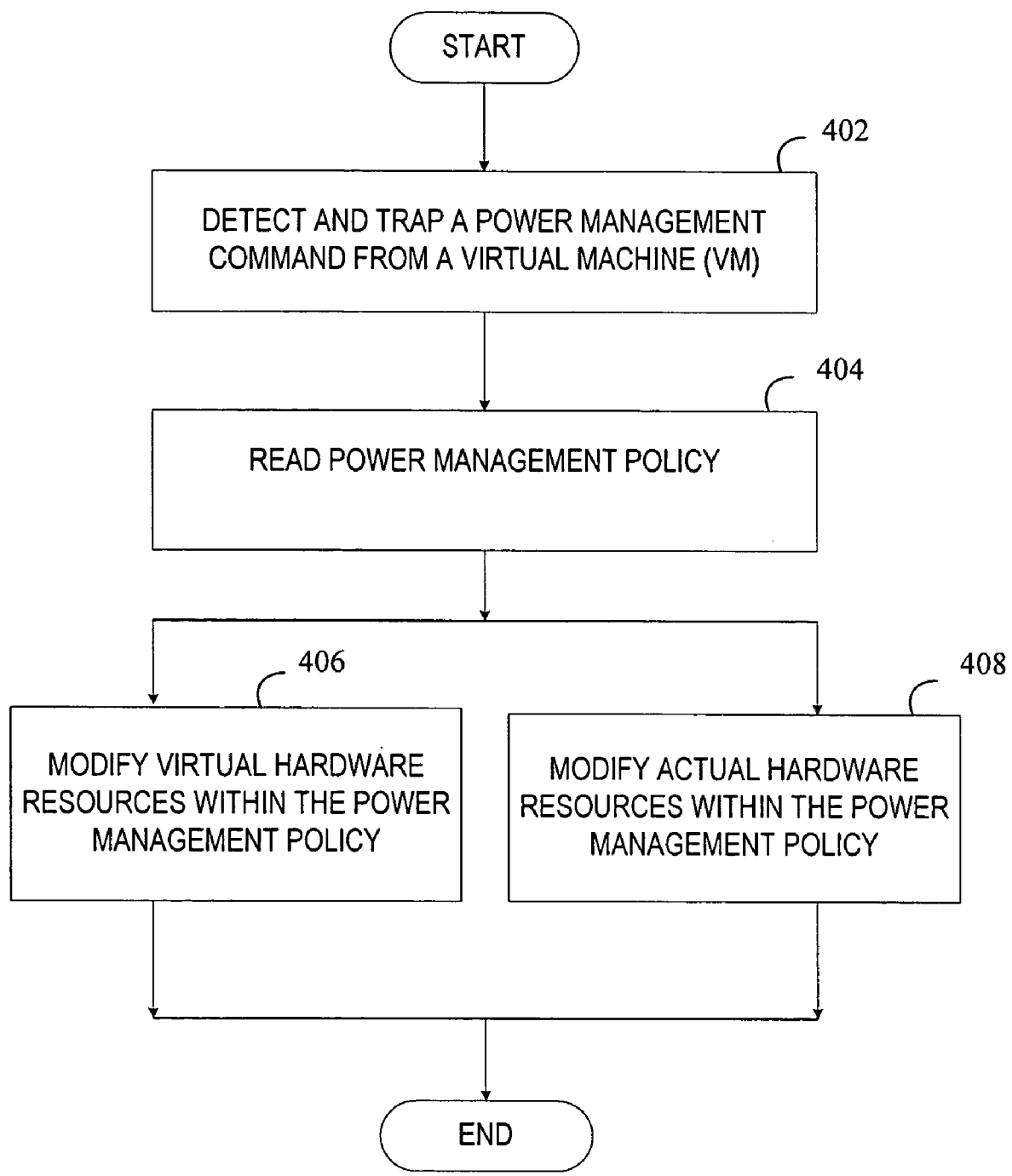
FIG. 4 is a flow diagram illustrating an example of facilitating power management commands from the different VMs, in accordance with one embodiment.

FIG. 4 is a flow diagram illustrating an example of facilitating power management commands from the different VMs, in accordance with one embodiment. The VMM 125 may have already been loaded, one or more VMs may be active, and the power management policy 210 may have already been initialized. Furthermore, guess OS may have already been launched in the VMs. At block 402, the VMM 125 detects and traps a power management command issued by a VM. This may be performed by the STM, as described above. At block 404, the power management policy 210 may be accessed to determine the global power management policy and current power state information of the VMs in the system. Depending on the situation, the process may flow to block 406 where the VMM 125 may emulate response to the power management commands issued by the VM. The emulation may include executing a service routine in the SMM 305 to update virtual registers as viewed by the VM and to update the current power state information corresponding to the VM. Alternatively, the process may flow from block 404 to block 408 where actual hardware resources update may be performed.

Thus, a method and apparatus for handling power management commands using a VMM have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:
   issuing, from a first virtual machine (VM), a power management command;
   trapping, to a virtual machine monitor, the power management command;
   determining, by the virtual machine monitor based on a global power management policy, whether to emulate a response to the power management command; and
   emulating, by the virtual machine monitor, a response to the power management command.

2. The method of claim 1, wherein emulating the response includes decreasing resources available to the first VM when the power management command indicates that the first VM is to be in a lower power consumption state.

3. The method of claim 2, wherein the resources available to the first VM is decreased without modifying actual hardware resources available in the virtual machine environment.

4. The method of claim 3, wherein the resources available to the first VM is decreased by slowing down operations of the first VM.

5. The method of claim 2, wherein the resources available to the first VM is decreased without affecting a current power state of a second VM in the virtual machine environment.

6. The method of claim 5, further comprising keeping track of a current power state of the first VM and the current power state of the second VM.

7. The method of claim 2, wherein emulating the response includes increasing resources available to the first VM when the power management command indicates that the first VM is to be in a higher power consumption state.

8. The method of claim 7, wherein the resources available to the first VM is increased without modifying actual hardware resources available in the virtual machine environment.

9. The method of claim 8, wherein the actual hardware resources available in the virtual machine environment include a processor, and wherein modifying the hardware resources includes modifying power management registers associated with the processor.

10. The method of claim 8, wherein the resources available to the first VM is increased based on a current power state and local power management policy associated with the first VM.

11. The method of claim 1, wherein trapping the power management command from the first VM is performed using system management interrupt transfer monitor (STM).

12. The method of claim 1, wherein emulating the response includes slowing down operations of the first VM and indicating to the first VM that it is operating in the low power consumption state.

13. A method, comprising:
 issuing, from a first virtual machine (VM), a power management command;
 trapping, to a virtual machine monitor, the power management command;
 determining, by the virtual machine monitor based on a global power management policy, whether to emulate a response to the power management command; and
 responding, by the virtual machine monitor, to the power management command by decreasing hardware resources available in the VM environment.

14. The method of claim 13, wherein current power states of the other VMs in the VM environment are not affected by decreasing the hardware resources available in the VM environment.

15. The method of claim 14, wherein decreasing hardware resources available in the VM environment includes modifying power management registers of a processor in the VM environment.

16. The method of claim 13, wherein determining whether to emulate the response is also based on local power management policies associated with each of the VMs in the VM environment.

17. A system, comprising:
 hardware resources;
 a processor to present one or more virtual machines (VMs) to guest software, and
  to execute a virtual machine monitor (VMM) to control modification of the hardware resources, wherein power management commands issued by the one or more VMs are trapped to the VMM to determine, based on a global power management policy, whether to emulate a response.

18. The system of claim 17, wherein the VMM processes the power management commands from a first VM without impacting power states of other VMs.

19. The system of claim 18, wherein the VMM processes the power management commands from the first VM by emulating decrease or increase of hardware resources available to the first VM.

20. The system of claim 19, further comprising a system management mode (SMM) memory to store service routines to emulate the decrease or increase of hardware resources available to the first VM.

21. The system of claim 19, wherein when the power states of the other VMs are low power consumption states, the VMM processes the power management commands from the first VM by decreasing availability of the hardware resources.

* * * * *